(12) United States Patent
Yoshigi et al.

(10) Patent No.: US 6,637,664 B1
(45) Date of Patent: Oct. 28, 2003

(54) COMPOSITE IC CARD

(75) Inventors: Hiroshi Yoshigi, Hinode (JP); Takehiro Ookawa, Tachikawa (JP); Tadashi Oonishi, Musashimurayama (JP); Kazuki Watanabe, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/018,802

(22) PCT Filed: Jun. 29, 1999

(86) PCT No.: PCT/JP99/03474

§ 371 (c)(1),
(2), (4) Date: Dec. 21, 2001

(87) PCT Pub. No.: WO01/01339

PCT Pub. Date: Jan. 4, 2001

(51) Int. Cl.⁷ .............................................. G06K 19/06
(52) U.S. Cl. ...................................... 235/492; 235/441
(58) Field of Search ................................ 235/375, 380, 235/382, 441, 449, 492; 340/825

(56) References Cited

U.S. PATENT DOCUMENTS

| 5,113,184 A | * | 5/1992 | Katayama ................. 340/10.51 |
| 5,418,353 A | * | 5/1995 | Katayama et al. .......... 235/380 |
| 5,736,728 A | * | 4/1998 | Matsubara .................. 235/492 |
| 5,999,713 A | * | 12/1999 | Reiner et al. ............... 710/301 |
| 6,045,043 A | * | 4/2000 | Bashan et al. .............. 235/441 |
| 6,070,804 A | * | 6/2000 | Miyamoto ................... 235/494 |
| 6,079,622 A | * | 6/2000 | Goto .......................... 235/492 |
| 6,427,065 B1 | * | 7/2002 | Suga et al. ................. 455/41.1 |

FOREIGN PATENT DOCUMENTS

| JP | 04-023092 | * | 1/1992 |
| JP | 04-172588 | * | 6/1992 |
| JP | 10-505932 |   | 6/1998 |
| JP | 10-209782 | * | 8/1998 |

* cited by examiner

*Primary Examiner*—Karl D. Frech
*Assistant Examiner*—Edwyn Labaze
(74) *Attorney, Agent, or Firm*—Mattingly, Stanger & Malur, P.C.

(57) ABSTRACT

For obtaining an IC card low in both power consumption and manufacturing cost, operating conditions in case of going through a contact point, which conditions are associated with supply voltage and signal level in an internal circuit, are to lie within operating conditions in case of going through an antenna. To this end, an IC chip of the IC card is provided with a voltage conversion circuit for lowering a supply voltage supplied through the contact point and a level conversion circuit for lowering the level of a signal fed from the contact point to the internal circuit and raising the level of a signal fed from the internal circuit to the contact point.

12 Claims, 4 Drawing Sheets

COMPOSITE IC CARD

TECHNICAL FIELD

The present invention relates to a card which incorporates a semiconductor integrated circuit (hereinafter referred to as "IC") and more particularly to an IC card permitting either a contact coupling wherein signals are transmitted and received under the supply of electric power through a contact or a non-contact coupling wherein signals are transmitted and received under the supply of electric power through an antenna, with respect to an external device.

BACKGROUND ART

As known well, a contact type IC card is coupled to through a contact point to an external device, e.g., a data reader/writer (simply "reader/writer" hereinafter), and performs the transmission and reception of signals between it and the reader/writer while being supplied with electric power through the contact point. On the other hand, a non-contact IC card is coupled to the reader/writer in a non-contact state through an antenna and performs the transmission and reception of signals between it and the reader/writer while being supplied with electric power through the antenna.

Recently, a single card which can operated in either the above contact or non-contact states has been devised or being developed as a dual interface IC card (see, for example, Published Japanese Translations of PCT International Publication for Patent Applications No. Hei 10-505932). The dual interface IC card is convenient for users and therefore its application range is being widened.

FIG. 4 shows the configuration of an internal circuit 12 in a conventional dual interface IC card. The internal circuit 12 is integrated into an IC chip. In case of operation in a non-contact state, electric power and signals are supplied through a coiled antenna 1, while in case of operation in a contact coupling state, electric power and signals are supplied through a contact point 2. As bidirectional signals to and from an information processor 3, signals having gone through either the antenna 1 or the contact point 2 are selected by a selector 4. For example, in the prior art being considered, the selection is made by detecting that electric power has been fed to a terminal Vdd of the contact point 2, which detection is performed by a voltage detector 11. As a result of the detection, the signals having gone through the contact point 2 are selected.

Usually, the information processor 3 has a processing unit and a memory and reads the contents of the memory in accordance with directions given by a reader/writer and provides a transmission signal or rewrites the memory contents in accordance with a reception signal provided from the reader/writer.

In a non-contact operation, electric power is obtained by rectifying a high frequency signal received by the antenna 1 in a rectifier 5, smoothing the rectified signal in a capacitor C and making the voltage thereof into a predetermined voltage in a series regulator 6. On the other hand, electric power from the contact point 2 is obtained directly from the reader/writer through the terminal Vdd.

DISCLOSURE OF THE INVENTION

Electric power and signals provided from the contact point 2 are defined by ISO7816 which is the international standard for contact type IC cards. Two kinds of supply voltages Vdd are defined therein, which are 4.5V–5.5V and 2.7V–3.3V. Further, it is defined therein that a minimum value at a higher signal level ("H" level) should be 0.7 Vdd. The internal circuit 12 in an IC chip constituted by the information processor 3, etc. is designed to operate with this voltage.

On the other hand, electric power and signals provided from the antenna 1 are supplied in a non-contact state from a reader/writer and the electric power to be supplied is limited. For this reason the circuit is required to operate at as low a voltage and power consumption as possible. In the case of an IC card used exclusively for a non-contact operation, a circuit is being developed which operates at a supply voltage of 2V or so.

However, the internal circuit 12 in the conventional dual interface IC card has been designed to operate at a low voltage in case of a non-contact operation and operate at a higher voltage, for example, 5.5V in case of a contact operation. Thus, although the internal circuit 12 can operate at a low voltage, a lowering of power consumption is obstructed and circuit components have so far been required to have a high voltage proof so as to withstand voltages provided from terminals of the contact point 2. An IC using transistors of a high voltage proof requires a complicated manufacturing step and thus an increase of cost is unavoidable.

It is an object of the present invention to provide an IC card low in both power consumption and manufacturing cost.

For achieving the above-mentioned object, the IC card of the present invention is characterized in that operating conditions in case of going through a contact point, which conditions are associated with supply voltage and signal level in an internal circuit, lie within operating conditions in case of going through an antenna.

Therefore, it becomes possible for the internal circuit to operate at low supply voltage and signal level common to both going through the antenna and going through the contact point. Thus, the power consumption is decreased. Besides, it becomes possible to set the voltage proof of circuit components at such a low level as has been adopted in the non-contact type. Consequently, it is possible to obtain an IC card easy to manufacture and low in cost.

The above operating conditions can be established by providing the IC chip with a voltage conversion means which converts the supply voltage provided through the contact point into a low voltage and a level conversion means which converts the signal level at the contact point into a signal level set in the internal circuit so as to decrease the signal level from the contact point and increase the signal level to the contact point.

Further, by providing the internal circuit with a voltage limiter means and by setting an output voltage of the voltage conversion means lower than a limit voltage set in the voltage limiter means, there can be obtained good results.

BEST MODE FOR CARRYING OUT THE INVENTION

Figure 1:
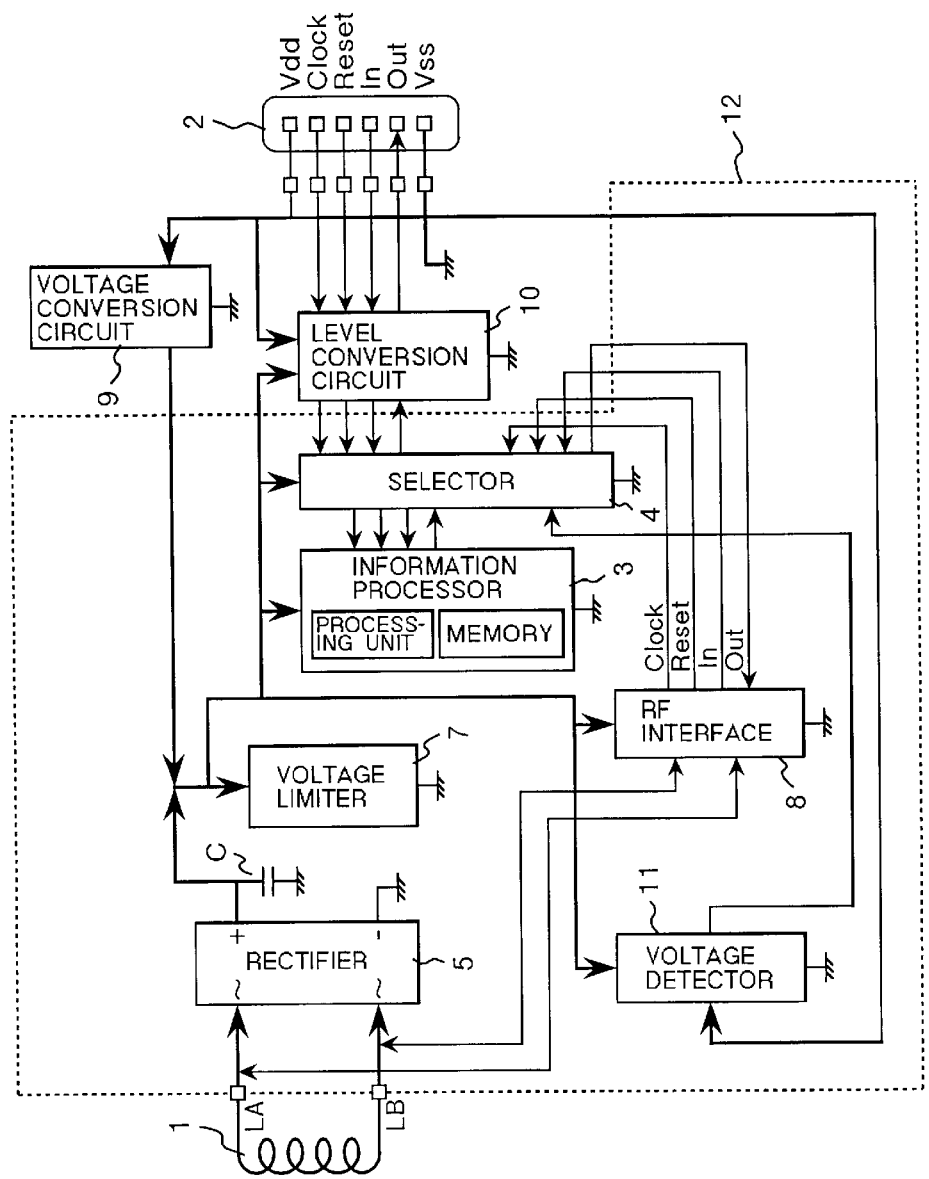
FIG. 1 is a circuit diagram for explaining a dual interface IC card according to a first embodiment of the present invention.

The IC card of the present invention will be described in more detail hereinunder by way of embodiments thereof illustrated in the drawings. The reference numerals and symbols common to FIGS. 1–4 represent the same or similar portions.

First Embodiment

In FIG. 1, the reference numeral 9 denotes a voltage conversion circuit which decreases a voltage provided from a power terminal Vdd of a contact point 2, the numeral 10 denotes a level conversion circuit which lowers signal levels of signals provided from terminals Clock, Reset and In of the contact point 2 and supplies the signals to a selector 4 and which raises the level of a signal provided from the selector 4 and outputs the signal to a terminal Out of the contact point 2, and numeral 7 denotes a voltage limiter which limits the supply voltage in a non-contact operation. A terminal Vss of the contact point 2 is connected to ground.

In this embodiment, as the voltage conversion circuit 9, which serves as the voltage conversion means, there is used a conventional series regulator. The series regulator sets a source-drain voltage of a MOS transistor by a control voltage which supplied to the gate thereof. The voltage Vdd becomes lower by an amount corresponding to the source-drain voltage. The voltage conversion circuit 9 is not limited to the series regulator, but may be constituted, for example, by a resistor in the case where the current consumed in the internal circuit 12 changes little. A voltage drop induced by the resistor can be used for voltage conversion.

In this embodiment, the level conversion circuit 10 serves as the level conversion means, and as the level conversion circuit there is used a conventional circuit with a CMOS switch which performs a signal level conversion using a voltage difference between the source and drain of a MOS transistor in an ON condition. The level conversion circuit 10 is not limited to this switch circuit. For example, there may be used an amplifier and the gain thereof may be set so that a predetermined level conversion is performed.

Further, although a microprocessor is used for a processing unit in an information processor 3, this constitutes no limitation, but the processing unit may be constituted by a dedicated logic circuit.

Next, in the non-contact operation, the distance between the IC card and a reader/writer varies depending on a manner in that the IC card is used. The intensity of a radio wave from the reader/writer, the radio wave arriving at an antenna 1, varies according to the distance. A voltage limiter 7 provided in an internal circuit 12 serves as the voltage limiter, which limits the supply voltage so that a voltage exceeding a withstand voltage is not applied to a circuit component (an example of a simple structure is a Zener diode).

The voltage limiter 7 operates in such a manner that a high impedance is present until arrival at a limit voltage, while upon arrival at the limit voltage the impedance lowers and a current flows, thus preventing a further increase of voltage. Therefore, if an output voltage of the voltage conversion circuit 9 is set higher than the limit voltage, a certain configuration of the voltage conversion circuit 9 may induce a flow of a large current from the same circuit to the voltage limiter 7. This may result in damage to one or both of the voltage limiter 7 and the voltage conversion circuit 9. In this embodiment, for avoiding such an inconvenience, the output voltage of the voltage conversion circuit 9 is set lower than the limit voltage in the voltage limiter 7.

The internal circuit 12, voltage conversion circuit 9 and level conversion circuit 10 are integrated into a single IC chip. The voltage conversion circuit 9 and the level conversion circuit 10 are small in circuit scale and their area ratio on the IC chip is small relative to the whole area of the chip. As to transistors used, the voltage conversion circuit 9 and the level conversion circuit 10 are rendered highly voltage-proof merely partially as in the prior art, while the greater part of the IC chip is of a low voltage proof and the occupying area thereof is small. Consequently, the area of the IC chip can be made smaller than in the prior art.

The IC chip and the antenna 1 which is coiled are embedded in a basis material of the card and the contact point 2 is mounted on the back side of the basis material to constitute a dual interface IC card.

Figure 2:
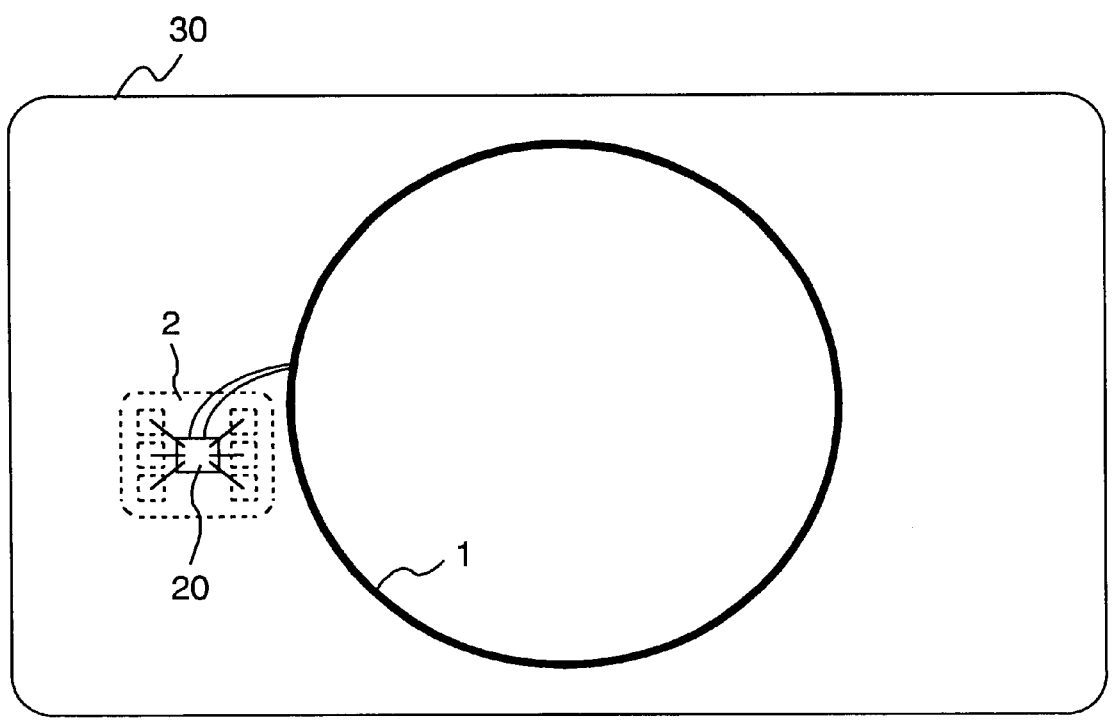
FIG. 2 is a plan view of the dual interface IC card for explaining the first embodiment.

FIG. 2 is a plan view of the IC card with a surface layer of the card basis material removed. In the same figure, the numeral 20 denotes the IC chip and numeral 30 denotes the IC card with the surface layer removed. The IC chip 20 is connected to the terminals of the contact point 2 by wire bonding.

The operation of the dual interface IC card of this embodiment will now be described first with respect to the operation through the antenna 1. In this operation, electric power, clock signal and data are received from terminals LA and LB through the antenna 1, while data is transmitted from the antenna 1 in the direction opposite to the receiving direction, thus performing communication.

More specifically, a high frequency signal received by the antenna 1 is rectified by a rectifier 5 and is smoothed by a capacitor C into a supply voltage. This supply voltage is limited by the voltage limiter 7 to a level not higher than a certain voltage defined by a withstand voltage of the circuit and is fed as a power supply of the internal circuit 12.

On the other hand, an RF interface 8 connected to the antenna 1 demodulates the high frequency signal received by the antenna 1, extracts a clock signal and data and produces a reset signal. Further, using transmission data produced in the internal circuit 12 of the IC chip, the RF interface 8 modulates a non-modulated part of the high frequency signal provided from the antenna 1 and thereby sends the transmission data back to the reader/writer through the antenna 1.

The clock signal, demodulated data and reset signal obtained in the RF interface 8 are inputted to the information processor 3 through the selector 4. In the information processor 3, the storage of demodulated data into memory and the transmission of data for reply are performed in accordance with a predetermined procedure. The transmission data for replay is sent to the RF interface 8 through the selector 4 and is further sent back to the reader/writer through the antenna 1 as described above.

Next, the operation of the dual interface IC card of this embodiment will be described with respect to the case of going through the contact point. In this case, communication is made through the reader/writer and the terminals of the contact point 2. Supply voltage is fed through the terminal Vdd of the contact point 2 and is converted by the voltage conversion circuit 9 as a series regulator into a voltage lower than the voltage limited in the voltage limiter 7, then the thus-converted voltage is fed to each interior circuit.

Clock signal, reset signal, and received data are fed through the terminals Clock, Reset, and In, respectively, of the contact point 2. The signal level at each terminal is 0.7 Vdd which is defined by ISO7816, as noted earlier. These signals pass through the level conversion circuit 10 for conversion into the signal level in the internal circuit 12, then the thus level-converted signals are inputted to the information processor 3 through the selector 4. Under control of the voltage detector 11 the selector 4 operates so as to select signals provided through the contact point 2 when electric power is fed to the terminal Vdd of the contact point 2.

The transmission data for replay produced in the information processor 3 passes through the selector 4, then its level is converted by the level conversion circuit 10 into the level defined by ISO7816 and thereafter the thus level-converted data is sent to the terminal Out of the contact point 2.

In this way, also in the case of communication through the contact point, each circuit in the internal circuit 12 can be operated at a low voltage equal to that in the communication through the antenna coil. Thus, it becomes possible to set low the withstand voltage of each circuit component.

Second Embodiment

Figure 3:
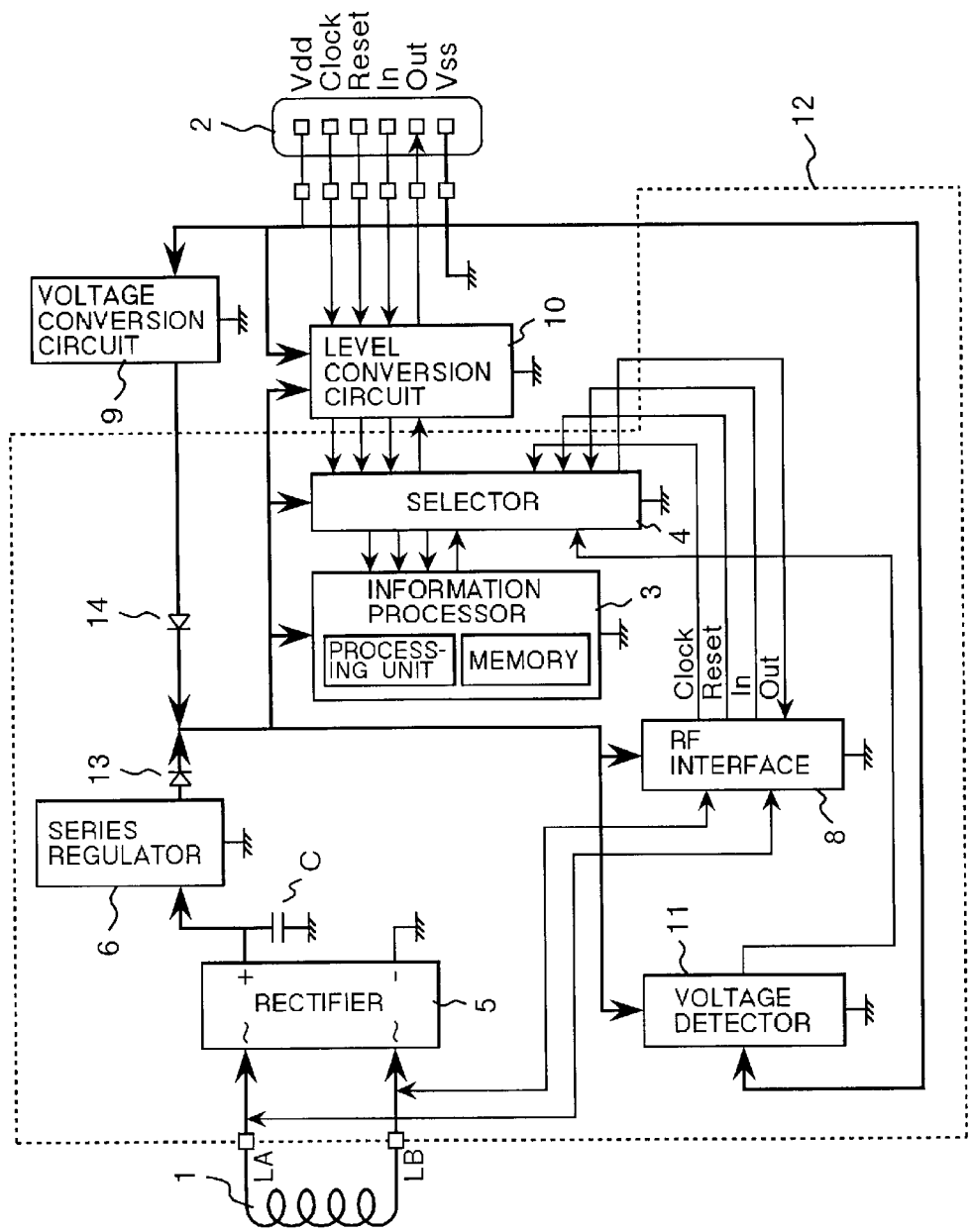
FIG. 3 is a circuit diagram for explaining a second embodiment of the present invention.
Figure 4:
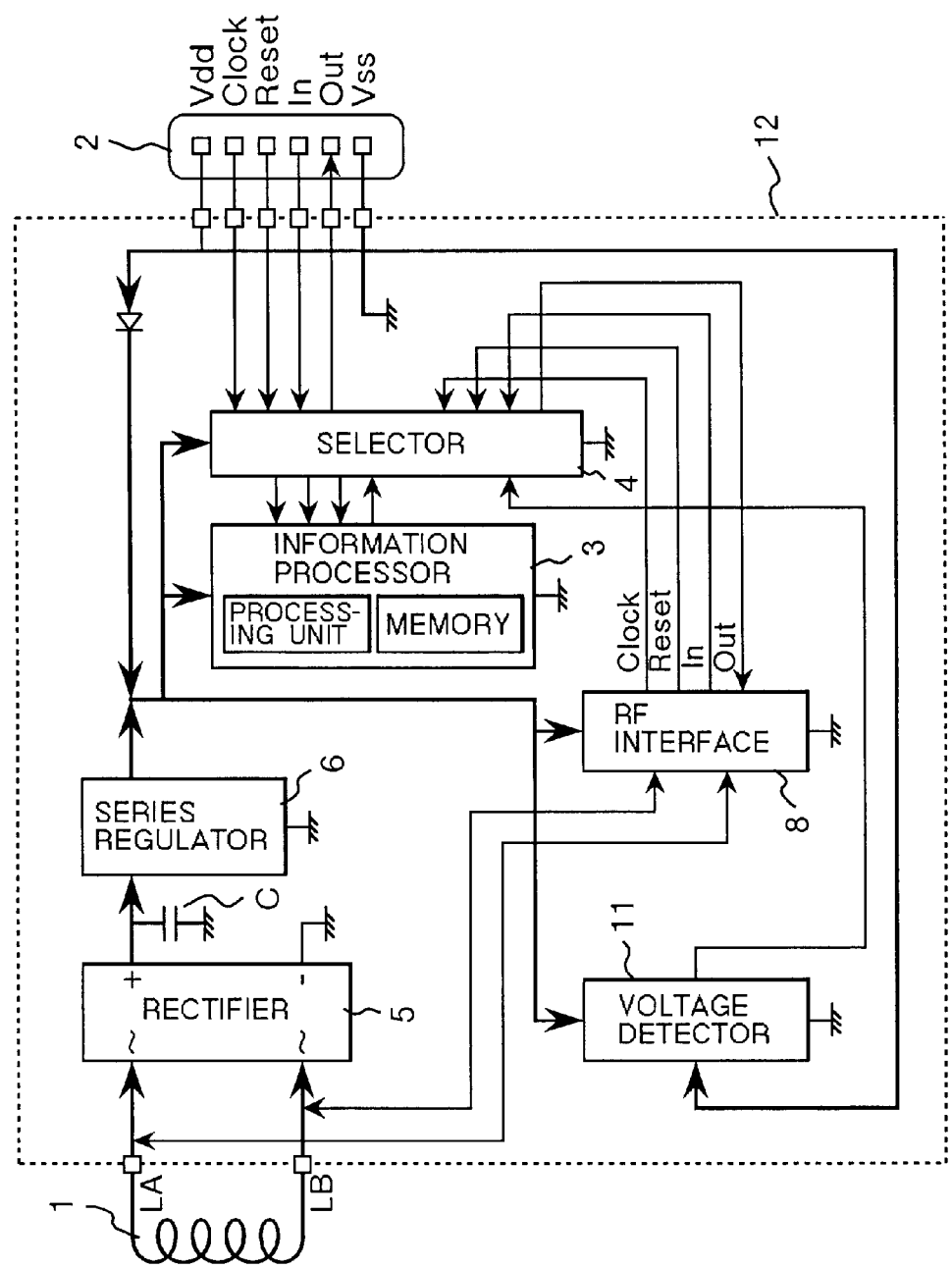
FIG. 4 is a circuit diagram for explaining a conventional dual interface IC card.

FIG. 3 illustrates an embodiment in which a series regulator is provided also in the power supply on the antenna side. In this embodiment, since the supply voltage is stabilized by the series regulator 6, it is not necessary to use the voltage limiter 7. Also in this embodiment, like the first embodiment, a series regulator is adopted as the voltage conversion circuit 9. An output voltage thereof is set within the range of the output voltage of the series regulator 6. Reverse current flow preventing diodes 13 and 14 are connected to output sides of the voltage conversion circuit 9 and the series regulator 6, respectively.

According to the present invention, also in the contact operation it is possible to let the circuit operate at a low voltage as is the case with the non-contact operation and hence possible to lower the withstand voltage of the circuit components. Thus, it is possible to realize an IC card which is low in both power consumption and cost and which can be manufactured easily.

INDUSTRIAL APPLICABILITY

The IC card according to the present invention can handle a wide range of information, including cash, address, private information and identification; besides, the cost thereof is low. Therefore, it is applicable to a wide variety of fields, including financial, distribution, traffic, and medical care insurance fields.

What is claimed is:

1. An IC card comprising:
   a semiconductor integrated circuit having an internal circuit including an information processor incorporated therein,
   an antenna;
   a contact point;
   wherein supply of electric power and transmission and reception of signals with an external device can be carried out by either of going through the contact point or going through the antenna;
   a circuit that receives voltage through said antenna and provides an operating voltage to said internal circuit that is lower than voltage received through said contact point; and
   a voltage conversion circuit for converting the voltage received from the contact point to an operating voltage that is within operating conditions output from the circuit that receives voltage from the antenna.

2. The IC card according to claim 1, wherein the semiconductor integrated circuit includes
   a level conversion means for converting a level of a signal at the contact point into a level of a signal in the internal circuit.

3. The IC card according to claim 2, wherein the circuit that receives voltage through said antenna includes a voltage limiter for limiting the received supply voltage, and an output voltage of the voltage conversion means is lower than a limit voltage set in the voltage limiter.

4. The IC card according to claim 2, wherein the voltage conversion means is constituted by a voltage conversion circuit which converts the supply voltage received through the contact point into a low voltage lower than the voltage of the contact point and supplies the low voltage to the internal circuit, and the level conversion means is constituted by a level conversion circuit which converts the level of the signal at the contact point into a low level lower than a level of the contact point and supplies the low-level signal to the internal circuit and which converts the level of the signal provided from the internal circuit into a high level higher than the level output by the internal circuit and sends the high-level signal to the contact point.

5. An IC card comprising:
   a semiconductor integrated circuit having an internal circuit including an information processor incorporated therein,
   an antenna;
   a contact point;
   wherein supply of electric power and transmission and reception of signals with an external device can be carried out by either of going through the contact point or going through the antenna,
   a voltage conversion means for converting a supply voltage fed through the contact point; and
   a level conversion means for converting a level of a signal at the contact point into a level of a signal in the internal circuit;
   wherein the internal circuit includes a voltage limiter for limiting the supply voltage, and an output voltage of the voltage conversion means is lower than a limit voltage set in the voltage limiter,
   wherein the internal circuit comprises a rectifier connected to the antenna, a voltage limiter connected to an output terminal of the rectifier, an RF interface which modulates and demodulates signals passing through the antenna, a selector which selects either a signal going through the RF interface or a signal going through the contact point, and an information processor which stores a signal received from the selector into a memory and produces a signal to be transmitted to the selector, and
   wherein the semiconductor integrated circuit is formed as a IC chip integrating the internal circuit, the voltage conversion means and the level conversion means, the voltage conversion means being constituted by a voltage conversion circuit which converts the supply voltage provided through the contact point into a low voltage and supplies the low voltage to the internal circuit, the level conversion means being constituted by a level conversion circuit which converts the level of the signal provided from the internal circuit into a high level and sends the high-level signal to the contact point.

6. An IC card comprising:
   a semiconductor integrated circuit integrating an internal circuit including an information processor incorporated therein,
   an antenna, and
   a contact point;

wherein supply of electric power and transmission and reception of signals with an external device can be carried out by either of going through the contact point or going through the antenna, and wherein the semiconductor integrated circuit is provided with a voltage conversion circuit which converts a supply voltage fed through the contact point into a low voltage lower than the voltage of the contact point and supplies the low voltage to the internal circuit, and a level conversion circuit which converts a level of a signal provided from the internal circuit into a high level higher than the level output by the internal circuit and supplies the high-level signal to the contact point.

7. The IC card according to claim 6, wherein the internal circuit includes a voltage limiter for limiting the supply voltage, and an output voltage of the voltage conversion circuit is lower than a limit voltage set in the voltage limiter.

8. An IC card comprising:

a semiconductor integrated circuit having an internal circuit including an information processor incorporated therein, an antenna;

a contact point;

wherein supply of electric power and transmission and reception of signals with an external reader/writer can be carried out by either of going through the contact point or going through the antenna, and wherein the semiconductor integrated circuit has a voltage conversion circuit for converting a supply voltage supplied through the contact point into a low voltage lower than the contact point, and an output voltage of the voltage conversion circuit is lower than a withstand voltage of the internal circuit which is determined by withstand voltages of circuit components of the internal circuit.

9. The IC card according to claim 8, wherein the semiconductor integrated circuit further includes a level conversion circuit which converts a level of a signal at the contact point into a low level and supplies the low-level signal to the internal circuit and converts a level of a signal provided from the internal circuit into a high level and supplies the high-level signal to the contact point.

10. An IC card comprising:

a semiconductor integrated circuit having an internal circuit including an information processor incorporated therein, an antenna;

a contact point;

wherein supply of electric power and transmission and reception of signals with an external device can be carried out by either of going through the contact point or going through the antenna;

wherein the internal circuit has an operating voltage that is lower than a voltage level received through said contact point, a voltage conversion circuit for converting the voltage level received from the contact point to the operating voltage of the internal circuit, and a circuit connected to the internal circuit that receives voltage through said antenna and outputs voltage at a level of the operating voltage of the internal circuit.

11. The IC circuit according to claim 10, wherein the circuit that receives voltage through said antenna is a voltage limiter circuit.

12. The IC circuit according to claim 10, wherein the circuit that receives voltage through said antenna is a series regulator circuit.

* * * * *